(12) United States Patent
Sun

(10) Patent No.: US 12,443,026 B2
(45) Date of Patent: Oct. 14, 2025

(54) TELESCOPIC ROD ENDOSCOPE

(71) Applicant: ScopeAround, Irvine, CA (US)

(72) Inventor: Yingjie Sun, Irvine, CA (US)

(73) Assignee: ScopeAround, Irvine, CA (US)

( * ) Notice: Subject to any disclaimer, the term of this patent is extended or adjusted under 35 U.S.C. 154(b) by 411 days.

(21) Appl. No.: 18/164,481

(22) Filed: Feb. 3, 2023

(65) Prior Publication Data

US 2024/0231073 A1    Jul. 11, 2024

(30) Foreign Application Priority Data

Jan. 10, 2023    (CN) .................... 202320073886.7

(51) Int. Cl.
    *G02B 23/24*      (2006.01)

(52) U.S. Cl.
    CPC ............................ *G02B 23/2484* (2013.01)

(58) Field of Classification Search
    None
    See application file for complete search history.

(56) References Cited

U.S. PATENT DOCUMENTS

| | | | |
|---|---|---|---|
| 4,567,880 A | 2/1986 | Goodman | |
| 6,540,668 B1* | 4/2003 | Schulz | A61B 1/055<br>600/167 |
| 8,216,127 B2 | 7/2012 | Zifeng et al. | |
| 8,713,999 B2* | 5/2014 | Hatcher | G02B 23/2484<br>73/112.01 |
| 11,925,326 B1* | 3/2024 | Dawoodjee | H04N 7/015 |
| 2010/0022831 A1 | 1/2010 | Zifeng et al. | |
| 2016/0150944 A1* | 6/2016 | Tearney | A61B 1/0676<br>600/109 |
| 2016/0330351 A1* | 11/2016 | DeAscanis | H04N 23/57 |
| 2020/0393112 A1* | 12/2020 | Portinga | F21K 9/233 |
| 2023/0277049 A1* | 9/2023 | von Wendorff | A61B 1/0676<br>600/109 |

FOREIGN PATENT DOCUMENTS

JP          2016214282 A    * 12/2016

* cited by examiner

*Primary Examiner* — Ryan Crockett

(57) ABSTRACT

Disclosed is a telescopic rod endoscope, including a shaping pipe, wherein one end of the shaping pipe is fixedly connected to one end of a telescopic pipe; a camera is mounted at the other end of the shaping pipe; the other end of the telescopic pipe is fixedly connected to a guide pipe; a connecting line is sleeved between inner cavities of the guide pipe and the telescopic pipe; and one end of the connecting line penetrates through the shaping pipe and is electrically connected to the camera, and the other end of the connecting line penetrates through the guide pipe and is connected to an external interface. Through extension and contraction of the telescopic pipe, the telescopic pipe facilitates observation of high and distant targets when being extended, and the shaping pipe is convenient for the camera to make small directional changes, thereby facilitating observation.

4 Claims, 3 Drawing Sheets

TELESCOPIC ROD ENDOSCOPE

TECHNICAL FIELD

The present invention relates to the technical field of endoscopes, and in particular to a telescopic rod endoscope.

BACKGROUND

Industrial endoscopes are often used to extend into a device gap or a pipeline for observation so as to perform observation. The endoscopes often include a camera and a long rod for mounting the camera. When existing endoscopes observe high and distant objects, a very long rod is required, and increasing the length of the long rod will lead to poor storage. For the above problem, the inventor proposed a telescopic rod endoscope to solve the above problem.

SUMMARY

To solve the problem that when existing endoscopes observe high and distant objects, a very long rod is required, and increasing the length of the long rod will lead to poor storage, an objective of the present invention to provide a telescopic rod endoscope.

To solve the above technical problem, the present invention adopts the following technical solution: a telescopic rod endoscope includes a shaping pipe, wherein one end of the shaping pipe is fixedly connected to one end of a telescopic pipe; a camera is mounted at the other end of the shaping pipe; the other end of the telescopic pipe is fixedly connected to a guide pipe; a connecting line is sleeved between inner cavities of the guide pipe and the telescopic pipe; and one end of the connecting line penetrates through the shaping pipe and is electrically connected to the camera, and the other end of the connecting line penetrates through the guide pipe and is connected to an external interface.

Preferably, a holding sleeve is fixedly sleeved on an outer wall of one end, close to the guide pipe, of the telescopic pipe; and the external interface is a USB interface.

Preferably, the telescopic pipe includes an inner pipe; the shaping pipe is fixedly sleeved on an end face of one end of the inner pipe; the other end of the inner pipe is slidingly sleeved in an inner cavity of a first intermediate pipe; the first intermediate pipe is slidingly sleeved in an inner cavity of a second intermediate pipe; the second intermediate pipe is slidingly sleeved in an inner cavity of an outer pipe; and one end, away from the shaping pipe, of the outer pipe is fixedly connected to the guide pipe.

Preferably, limiting protrusions are integrally formed on inner walls of two ends of the first intermediate pipe and the second intermediate pipe, and are integrally formed on inner walls of one end close to the shaping pipe and a middle part of the outer pipe; a friction ring is fixedly mounted on an outer wall of one end, away from the shaping pipe, of each of the inner pipe, the first intermediate pipe and the second intermediate pipe; a fixing block is fixedly mounted on an inner wall of the inner pipe; and the connecting line fixedly penetrates through the fixing block.

Preferably, the guide pipe is a stainless steel arc-shaped spring hose; and a silica gel gasket is fixedly sleeved on an inner wall of one end, away from the telescopic pipe, of the guide pipe.

Compared with the prior art, the present invention has the following beneficial effects:

through extension and contraction of the telescopic pipe, the telescopic pipe facilitates observation of high and distant targets when being extended, and the shaping pipe is convenient for the camera to make small directional changes, thereby facilitating observation; when not in use, the telescopic pipe is contracted, thereby facilitating carrying;

when the telescopic pipe is extended, the connecting line is pulled into the guide pipe and the telescopic pipe, the guide pipe guides the connecting line, and the silica gel gasket is sleeved at the tail end of the guide pipe, thereby avoiding damage caused by friction between the connecting line and the end face of the guide pipe, and ensuring the life of the connecting line.

BRIEF DESCRIPTION OF THE DRAWINGS

The drawings of the specification that constitutes a part of the present application are used to provide a further understanding of the present invention. The exemplary embodiments of the present invention and the description thereof are used to explain the present invention, and do not constitute an improper limitation of the present invention.

To describe the technical solutions in the embodiments of the present invention or in the prior art more clearly, the following briefly describes the accompanying drawings required for describing the embodiments or the prior art. Apparently, the accompanying drawings in the following description show some embodiments of the present invention, and a person of ordinary skill in the art may still derive other drawings from these accompanying drawings without creative efforts.

Figure 1:
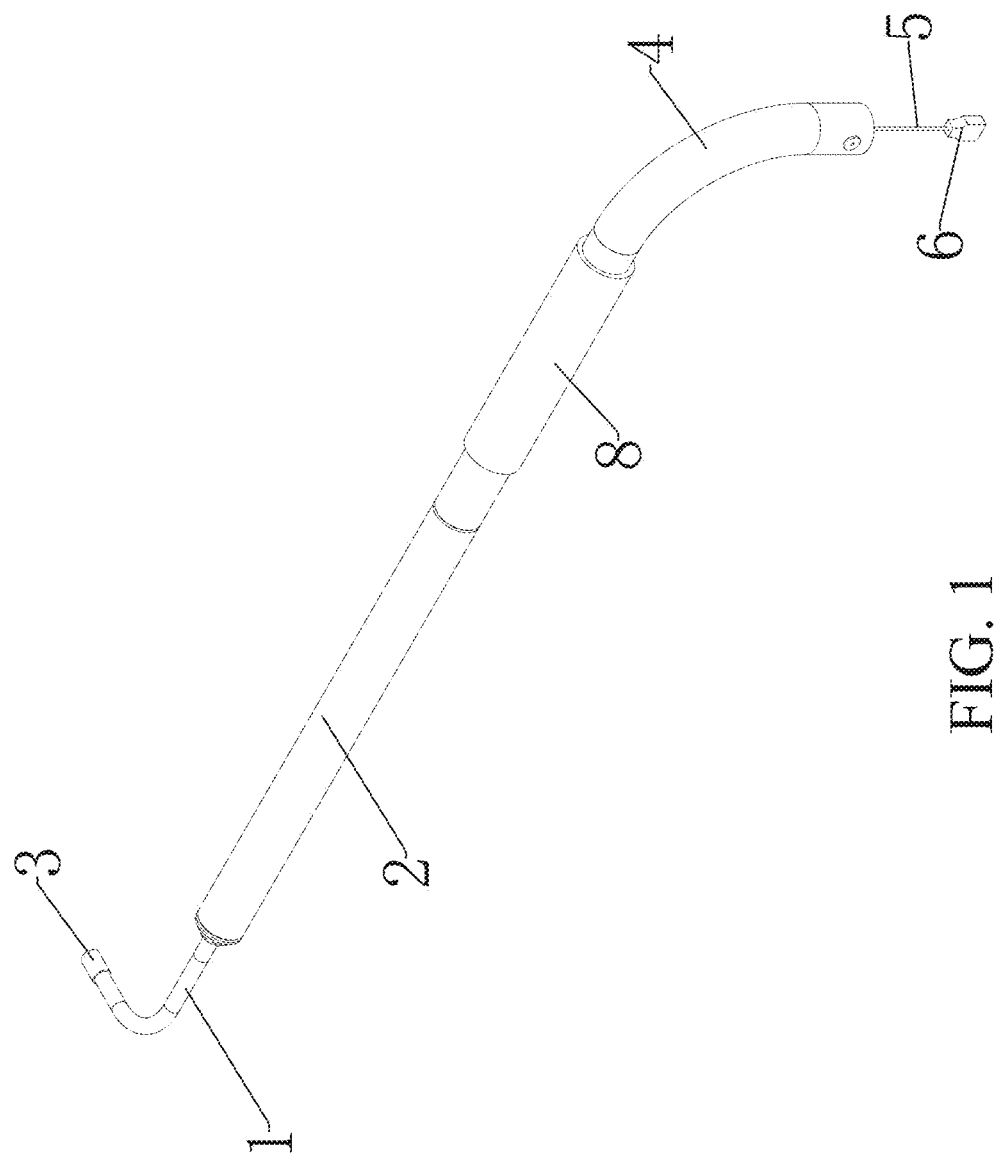
FIG. 1 is a structural schematic diagram according to the present invention.

Description of reference numerals: 1. shaping pipe; 2. telescopic pipe; 21. inner pipe; 22. first intermediate pipe; 23. second intermediate pipe; 24. limiting protrusion; 25. friction ring; 26. fixing block; 27. outer pipe; 3. camera; 4. guide pipe; 5. connecting line; 6. external interface.

DETAILED DESCRIPTION OF THE EMBODIMENTS

The present invention is described in detail below with reference to the accompanying drawings and embodiments. Each example is provided to explain the present invention instead of limiting the present invention. In fact, those skilled in the art will appreciate that modifications and variations may be made in the present invention without departing from the scope or spirit of the present invention. For example, features shown or described as one part of one embodiment may be applied to another embodiment to generate yet another embodiment. Therefore, it is expected that the present invention includes such modifications and variations that fall within the scope of the appended claims and their equivalents.

In the description of the present invention, orientation or position relationships indicated by terms "longitudinal", "transverse", "upper", "lower", "front", "rear", "left", "right", "vertical", "horizontal", "top", "bottom" and the like are orientation or position relationships shown in the drawings, and these terms are merely for facilitating description of the present invention, but not for requiring that the present invention must be constructed and operated in a specific orientation, and thus, these terms cannot be understood as a limitation to the present invention. As used in the present invention, the terms "connected", "connection" and "set" should be understood in a broad sense, for example, they may be fixed connection or detachable connection, they may be direct connection or indirect connection through an intermediate part; or they may be wired connection and wireless connection, or may be connection through a wireless communication signal. For those of ordinary skill in the field, the specific meanings of the terms may be understood according to the specific conditions.

The accompanying drawings show one or a plurality of examples of the present invention. The detailed description uses reference numerals and letters to refer to the features in the accompanying drawings. Similar numeral references in the drawings and description have been used to refer to the similar parts in the present invention. As used herein, the terms "first", "second" and "third" are used interchangeably to distinguish one component from another component, and are not intended to indicate the position or importance of individual components.

Figure 2:
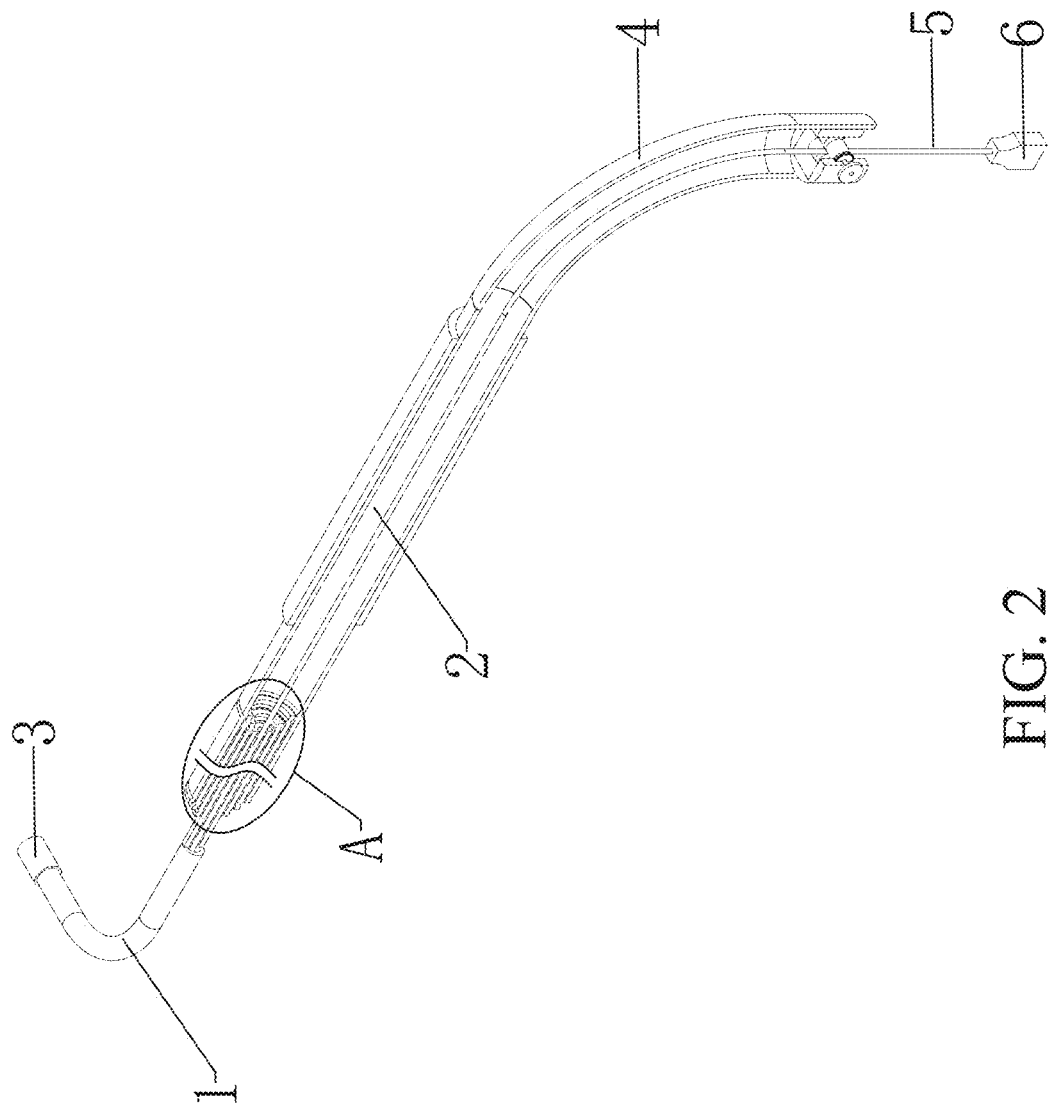
FIG. 2 is a schematic diagram of a sectional structure according to the present invention.
Figure 3:
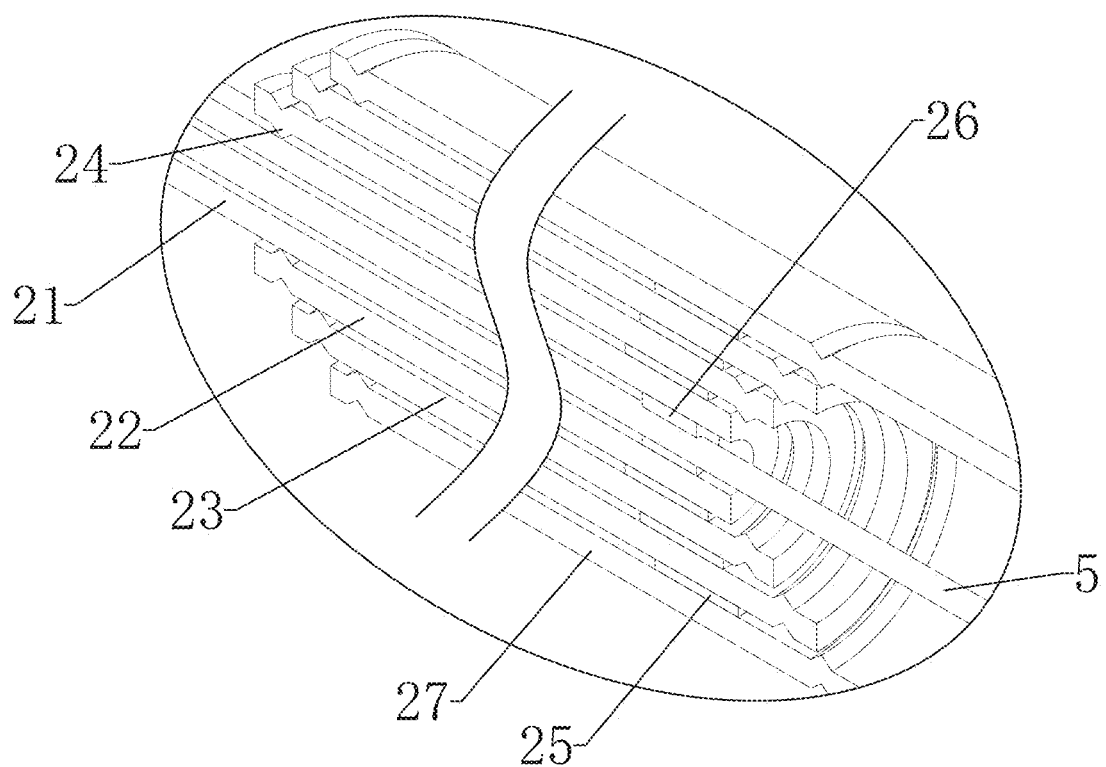
FIG. 3 is a schematic diagram of an enlarged structure at a position A in FIG. 2 according to the present invention.

Embodiments: as shown in FIG. 1 to FIG. 3, the present invention provides a telescopic rod endoscope, including a shaping pipe 1, wherein one end of the shaping pipe 1 is fixedly connected to one end of a telescopic pipe 2; a camera 3 is mounted at the other end of the shaping pipe 1; the other end of the telescopic pipe 2 is fixedly connected to a guide pipe 4; a connecting line 5 is sleeved between inner cavities of the guide pipe 4 and the telescopic pipe 2; and one end of the connecting line 5 penetrates through the shaping pipe 1 and is electrically connected to the camera 3, and the other end of the connecting line 5 penetrates through the guide pipe 4 and is connected to an external interface 6.

By the above technical solution, through extension and contraction of the telescopic pipe 2, the telescopic pipe facilitates observation of high and distant targets when being extended, and the shaping pipe 1 is convenient for the camera 3 to make small directional changes, thereby facilitating observation; furthermore, the guide pipe 4 guides the connecting line 5 during extension and contraction of the telescopic pipe 2; and when not in use, the telescopic pipe 2 is contracted, and the volume of an apparatus is reduced, thereby facilitating carrying.

Further, a holding sleeve 8 is fixedly sleeved on an outer wall of one end, close to the guide pipe 4, of the telescopic pipe 2; and the external interface 6 is a USB interface.

Further, the telescopic pipe 2 includes an inner pipe 21; the shaping pipe 1 is fixedly sleeved on an end face of one end of the inner pipe 21; the other end of the inner pipe 21 is slidingly sleeved in an inner cavity of a first intermediate pipe 22; the first intermediate pipe 22 is slidingly sleeved in an inner cavity of a second intermediate pipe 23; the second intermediate pipe 23 is slidingly sleeved in an inner cavity of an outer pipe 27; and one end, away from the shaping pipe 1, of the outer pipe 27 is fixedly connected to the guide pipe 4; limiting protrusions are integrally formed on inner walls of two ends of the first intermediate pipe 22 and the second intermediate pipe 23, at one end, close to the shaping pipe 1, of the outer pipe 27, and an inner wall of a middle part; a friction ring 25 is fixedly mounted on an outer wall of one end, away from the shaping pipe 1, of each of the inner pipe 21, the first intermediate pipe 22 and the second intermediate pipe 23; a fixing block 26 is fixedly mounted on an inner wall of the inner pipe 21; and the connecting line 5 fixedly penetrates through the fixing block 26.

By the above technical solution, the connecting line 5 is fixedly connected in the inner pipe 21 through the fixing block 26, thereby ensuring that when the telescopic rod 2 is extended and the connecting line 5 extends into the telescopic pipe 2, the electrical connection of the camera 3 and the connecting line 5 will not be loosened, and the inner pipe 21, the first intermediate pipe 22 and the second intermediate pipe 23 can perform sliding extension and contraction, so that the observation requirements of different distances can be met; furthermore, when not in use, contraction facilitates carrying, and the stability after extension and contraction is facilitated by the friction force of the friction ring 25.

Further, the guide pipe 4 is a stainless steel arc-shaped spring hose; and a silica gel gasket is fixedly sleeved on an inner wall of one end, away from the telescopic pipe 2, of the guide pipe 4.

By the above technical solution, when the telescopic pipe 2 is extended, the connecting line 5 is pulled into the guide pipe 4 and the telescopic pipe 2, the guide pipes 4 guides the connecting line 5, and the silica gel gasket is sleeved at the tail end of the guide pipe 4, so that damage caused by friction between the connecting line 5 and the end face of the guide pipe 4 is avoided.

Working principle: the inner pipe 21, the first intermediate pipe 22 and the second intermediate pipe 23 can perform sliding extension and contraction, so that observation requirements of different distances can be met; furthermore, when not in use, contraction facilitates carrying; the stability after extension and contraction is facilitated by the friction force of the friction ring 25; during extension, observation of high and distant targets is facilitated, and the shaping pipe 1 is convenient for the camera 3 to make small directional changes, thereby facilitating observation; when the telescopic pipe 2 is extended, the connecting line 5 is guided by the guide pipe 4; furthermore, the silica gel is sleeved at the tail end of the guide pipe 4, thereby avoiding damage caused by friction between the connecting line 5 and the end face of the guide pipe 4, and ensuring the life of the connecting line 5.

The above is merely illustrative of the preferred embodiments of the present invention and is not intended to limit the present invention, and various changes and modifications may be made by those skilled in the art. Any modifications, equivalent substitutions, improvements, etc. made within the spirit and scope of the present invention should be included within the protection scope of the present invention.

The invention claimed is:

1. A telescopic rod endoscope, comprising a shaping pipe, wherein one end of the shaping pipe is fixedly connected to one end of a telescopic pipe; a camera is mounted at another end of the shaping pipe; another end of the telescopic pipe is fixedly connected to a guide pipe; a connecting line is sleeved between inner cavities of the guide pipe and the telescopic pipe; and one end of the connecting line penetrates through the shaping pipe and is electrically connected to the camera, and another end of the connecting line penetrates through the guide pipe and is connected to an external interface;

wherein the guide pipe is a stainless steel arc-shaped spring hose; and a silica gel gasket is fixedly sleeved on an inner wall of one end, away from the telescopic pipe, of the guide pipe.

2. The telescopic rod endoscope according to claim 1, wherein a holding sleeve is fixedly sleeved on an outer wall of one end, close to the guide pipe, of the telescopic pipe; and the external interface is a USB interface.

3. The telescopic rod endoscope according to claim 1, wherein the telescopic pipe comprises an inner pipe; the shaping pipe is fixedly sleeved on an end face of one end of the inner pipe; another end of the inner pipe is slidingly sleeved in an inner cavity of a first intermediate pipe; the first intermediate pipe is slidingly sleeved in an inner cavity of a second intermediate pipe; the second intermediate pipe is slidingly sleeved in an inner cavity of an outer pipe; and one end, away from the shaping pipe, of the outer pipe is fixedly connected to the guide pipe.

4. The telescopic rod endoscope according to claim 3, wherein limiting protrusions are integrally formed on inner walls of two ends of the first intermediate pipe and the second intermediate pipe, and are integrally formed on inner walls of one end close to the shaping pipe and a middle part of the outer pipe; a friction ring is fixedly mounted on an outer wall of one end, away from the shaping pipe, of each of the inner pipe, the first intermediate pipe and the second intermediate pipe; a fixing block is fixedly mounted on an inner wall of the inner pipe; and the connecting line fixedly penetrates through the fixing block.

\* \* \* \* \*